(No Model.)

T. MACE.
INSULATOR FOR ELECTRIC CONDUCTORS.

No. 272,069. Patented Feb. 13, 1883.

Witnesses
Chas. H. Smith
Harold Ferrell

Inventor
Theodore Mace
per Lemuel W. Serrell
atty.

UNITED STATES PATENT OFFICE.

THEODORE MACE, OF PLAINFIELD, NEW JERSEY.

INSULATOR FOR ELECTRIC CONDUCTORS.

SPECIFICATION forming part of Letters Patent No. 272,069, dated February 13, 1883.

Application filed February 23, 1882. (No model.)

*To all whom it may concern:*

Be it known that I, THEODORE MACE, of Plainfield, in the county of Union and State of New Jersey, have invented an Improvement in Insulators for Electric Conductors, of which the following is a specification.

Insulators made of glass or porcelain have been provided with a screw-hole for a screw, by which to fasten the same upon wood-work, and the electric conductor has either been twisted around such insulator or else been fastened thereto by a serving of wire. Furthermore, in fitting electric-lamp conductors into buildings it often becomes necessary to apply an additional support to a wire already in place. Conductors have been supported by wooden cleats, through which they passed, and two-part insulators have been placed in the holes of such cleats.

My invention relates to a two-part insulator having an opening through it for the passage of the electric conductor, and holes for the attaching-screws, so that the two parts can be placed at the sides of the conductor and fastened to place, thereby allowing the conductor to remain in a straight condition, and allowing for easily removing or loosening the conductor, and for placing any desired number of insulators upon a conductor for supporting the same.

Figure 3:
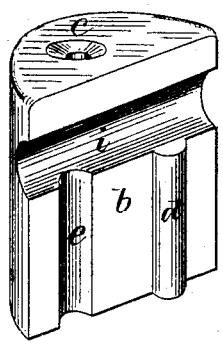
Figure 1:
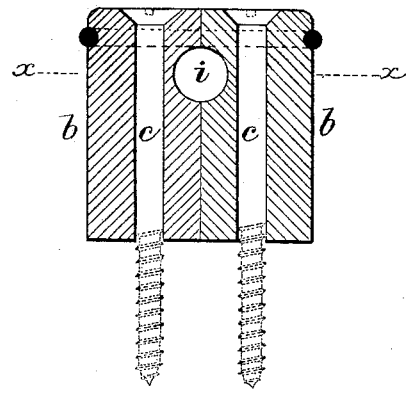
Figure 2:
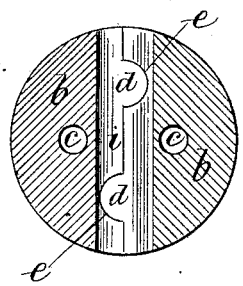

In the drawings, Figure 1 is a cross-section of the conductor and insulator. Fig. 2 is a section at the line $x\,x$, and Fig. 3 is a perspective view of one of the sections.

Each section of the insulator is by preference alike, so that they do not require to be sorted out in pairs. It may be made of porcelain, glass, hard rubber, or other non-conducting material. The general form of the insulator may be cylindrical or prismatic. I have shown the same as cylindrical.

Each half of the insulator is provided with a body, $b$, through which passes a hole, $c$, for an attaching-screw. There may be one flat side to each half-cylinder, the same corresponding to a plane passing through the axis of the cylinder; but I prefer to have an interlocking projection or rib, $d$, and a corresponding recess or groove, $e$, so that when the halves are placed together they will help to support each other.

The opening at $i$ for the passage of the electric conductor is formed by the grooves in the faces of the sections, so that the conductor can be laid into such opening or removed therefrom by loosening one or both of the screws.

I do not limit myself to the shape of the insulator or the interlocking projections; and I remark that a rubber band or winding of wire may be applied around the sections at the groove $o$. (Shown in Fig. 1.)

I claim as my invention—

An insulator for electric conductors, composed of two interchangeable sections, having a groove and a projection upon one face of each, whereby the two sections will interlock when placed together, and another groove, transverse to the interlocking groove and projection, for the conductor, and each section also being provided with a hole through it for the attaching-screw, substantially as described.

Signed by me this 17th day of February, A. D. 1882.

THEODORE MACE.

Witnesses:
  GEO. T. PINCKNEY,
  WILLIAM G. MOTT.